(12) United States Patent
Hubsher

(10) Patent No.: US 7,917,384 B2
(45) Date of Patent: Mar. 29, 2011

(54) ANALYTIC METHOD AND SYSTEM FOR OPTIMIZING AND ACCELERATING SALES

(75) Inventor: Ronald Hubsher, New York, NY (US)

(73) Assignee: Sales Optimization Group, Burlingame, CA (US)

( * ) Notice: Subject to any disclaimer, the term of this patent is extended or adjusted under 35 U.S.C. 154(b) by 1380 days.

(21) Appl. No.: 11/378,164

(22) Filed: Mar. 16, 2006

(65) Prior Publication Data

US 2007/0219848 A1 Sep. 20, 2007

(51) Int. Cl.
G06F 17/30 (2006.01)

(52) U.S. Cl. .......................................... 705/10
(58) Field of Classification Search ............ 705/10
See application file for complete search history.

(56) References Cited

U.S. PATENT DOCUMENTS

| | | | |
|---|---|---|---|
| 5,664,115 | A | 9/1997 | Fraser |
| 5,721,903 | A | 2/1998 | Anand |
| 6,055,513 | A | 4/2000 | Katz |
| 6,105,003 | A * | 8/2000 | Morohashi et al. ............ 705/26 |
| 6,332,129 | B1 * | 12/2001 | Walker et al. .................. 705/26 |
| 6,502,113 | B1 | 12/2002 | Crawford |
| 6,658,391 | B1 | 12/2003 | Williams et al. |
| 6,886,000 | B1 | 4/2005 | Aggarwal |
| 7,003,517 | B1 | 2/2006 | Seibel |
| 7,016,866 | B1 * | 3/2006 | Chin et al. ...................... 705/26 |
| 7,043,531 | B1 | 5/2006 | Seibel |
| 7,069,231 | B1 | 6/2006 | Cinarkaya |
| 2001/0011228 | A1 | 8/2001 | Shenkman |
| 2002/0002523 | A1 * | 1/2002 | Kossovsky et al. ............ 705/36 |
| 2002/0022986 | A1 | 2/2002 | Coker |
| 2002/0059095 | A1 | 5/2002 | Cook |
| 2002/0069101 | A1 | 6/2002 | Vincent |
| 2002/0087385 | A1 | 7/2002 | Vincent |
| 2002/0152147 | A1 | 10/2002 | Shulman |
| 2002/0194055 | A1 * | 12/2002 | Takakura et al. .............. 705/10 |
| 2003/0004880 | A1 | 1/2003 | Banerjee et al. |
| 2003/0028496 | A1 | 2/2003 | Yearworth |
| 2003/0046101 | A1 | 3/2003 | Dow |
| 2003/0046102 | A1 | 3/2003 | Dow |
| 2003/0069736 | A1 | 4/2003 | Koubenski et al. |
| 2003/0069737 | A1 | 4/2003 | Koubenski et al. |
| 2003/0069780 | A1 | 4/2003 | Hailwood |

(Continued)

OTHER PUBLICATIONS

Siebel Systems, Inc., Tele Atlas Pilot's Checklist—Name of Opportunity, 2002.

(Continued)

*Primary Examiner* — Romain Jeanty
(74) *Attorney, Agent, or Firm* — Amster, Rothstein & Ebenstein, LLP

(57) ABSTRACT

The present invention generally relates to a system and method for analyzing sales opportunities, and more particularly, provides a seller of goods and/or services the ability to predict whether potential customers are suitable to engage in a particular transaction. The present invention also assists a seller in identifying and removing unsuitable customers early in the sales process. The present invention utilizes metrics to measure the suitability of potential customers and analyzes, among other things, potential conflicts that may arise among key decision makers of the potential customers, with the seller working with those customers to resolve any such conflicts. Moreover, the present invention analyzes whether the potential customer has characteristics which are acceptable and/or unacceptable to the seller. Moreover, the seller analyzes its own products and/or services to determine whether it could provide such customer with a unique competitive advantage.

10 Claims, 10 Drawing Sheets

U.S. PATENT DOCUMENTS

| | | |
|---|---|---|
| 2003/0078788 A1 | 4/2003 | Sussman et al. |
| 2003/0088436 A1 | 5/2003 | Berger |
| 2003/0093284 A1 | 5/2003 | Kootale |
| 2004/0088264 A1 | 5/2004 | Preist |
| 2004/0102994 A1 | 5/2004 | Boppana |
| 2004/0133434 A1 | 7/2004 | Szlam |
| 2004/0230465 A1 | 11/2004 | Wookey |
| 2004/0243453 A1 | 12/2004 | Call et al. |
| 2005/0010537 A1 | 1/2005 | Ettinger, Jr. |
| 2005/0049954 A1 | 3/2005 | Graham et al. |
| 2005/0060182 A1 | 3/2005 | Nagelvoort |
| 2005/0086220 A1 | 4/2005 | Coker |
| 2005/0108043 A1 | 5/2005 | Davidson |
| 2005/0108103 A1 | 5/2005 | Roberts et al. |
| 2005/0197969 A1 | 9/2005 | McElroy et al. |
| 2005/0222850 A1 | 10/2005 | Armano et al. |
| 2005/0256752 A1 | 11/2005 | Ramachandran et al. |
| 2006/0179011 A1 | 8/2006 | Latz |

OTHER PUBLICATIONS

Holden International, The Selling Fox, pp. 174-177.

Heiman, Miller, The New Strategic Selling, Your Ideal Customer Profile, pp. 328-337.

Bosworth, Michael T., and Holland, John R., "CustomerCentric Selling", 2004, Chapter 14, "Negotiation, The Final Hurlde", pp. 193-205, McGraw-Hill, Two Penn Plaza, New York, NY, 10121-2298, USA.

Bosworth, Michael T., "Solution Sellings Creating Buyers in Difficult Selling Markets; 'Draw the Line in Price Negotiations'", 1995, pp. 145-162, McGraw Hill, Two Penn Plaza, New York, NY, 10121-2298, USA.

Camp Brain, Purchase Info/Support, http://web.archive.org/web/20061117192053/http://www.campbrain.com/index.php/purchase_info/support/, Nov. 17, 2006.

Dietmeyer, Brian J., "Strategic Negotiation—A Breakthrough 4-Step for Effective Business Negotiation", 2004, Chapter 2, "The Strategic Negotiation Process", pp. 13-25, Appendix 199, Dearborn Trade Publishing, 30 So. Wacker Dr., Suite 25000, Chicago, IL, USA.

L2S Inc., Conduct a Sales Forecast, http://web.archive.org/web/20060321140205/http://va-interactive.com/inbusiness/editorial/sales/ibt/sales_fo.html, Mar. 21, 2006.

* cited by examiner

| Key Discovery Questions | Answers |
|---|---|
| General Business | |
| Please tell me about your goals/mission ... | |
| If you were able to accomplish your mission what effect would that have? | |
| What steps are you taking to reach those goals? | |
| What would happen if this goals were missed? | |
| Tell me about your organization? | |
| What are some of the areas you would like to improve? | |
| What are your key challenges? | |
| Business Drivers/Need | |
| What prompted you to look at us? | |
| What is driving this need? (Business Level 1) | |
| .. and why is that ? (Business level 2) | |
| .. and why is that ? (Business level 3) | |
| Tell me about the people who Initiated this project and their objectives? | |
| How does this project fit in with you current corporate objectives? | |
| Time Frame | |
| Describe your ideal time frame to get a solution implemented? | |
| What is driving that date/timeframe? | |
| What happens if this project is not completed on time? | |
| Budget and Decision Making Process | |
| What is the decision making process for projects like this in your company? | |
| Please tell me about the people involved in the decision making process | |
| Tell me about the people this project will affect and how that will impact the decision making process? | |
| What obstacles might we encounter? | |
| Please describe your budgeting process for projects like this? (if not described above) | |
| What financial metrics will you use to make a go/no-go decision? | |
| Solution Fit and Competitive Set | |
| What are you looking for in an ideal solution? | |
| What are the critical success factors for this project? | |
| What solutions are you considering? | |
| What solutions have you used in the past? | |
| ...What have you liked about those solutions? | |
| ...What have you disliked? | |
| ...What are you looking to improve? | |
| What key criteria will you use to distinguish between solutions and chose the final one? | |
| What do you see as our competitive strength? | |
| What do you see as our competitive weakness? | |
| What would we have to do, to establish ourselves as the best solution provider? | |
| Personal Agenda | |
| If we hit a home run, how will this impact you and your company? | |
| What keeps you up at night about this project? | |
| Competitive Advantage (for each competitive Advantage) | |
| How important is <competitive advantage>? | |
| Why is that important to you? | |
| How would you feel about a company that offered you <competitive advantage>? | |
| Should that be on the list of critical success factors? | |

*FIG. 1*

Ideal Sales Fingerprint

| Opportunity Overview | |
|---|---|
| Buyer | Buyer Name |
| Size of opportunity | $ 540,000 |
| First Contact Date | 1-Jan-06 |
| Anticipated close date | 30-Jun-06 |
| Stage of opportunity | First Meeting |

| Opportunity? | Rating (1-10) |
|---|---|
| Large Hospital | 10 |
| 15-20% Medicaid Patents or just below 15% | 10 |
| High SSI utilization rate | 9 |
| No Appeal or Reopening of Package in the last 3 years | 9 |
| Not Currently filing DSH, or filing DSH in-house | 7 |
| Total | 45 |
| Assessment | 90% |

| Worth Pursuing? | Rating (1-5) |
|---|---|
| Good access to data | 9 |
| All electronic demographics | 8 |
| Admit to Pain | 7 |
| East Coast (less competition, higher margins) | 9 |
| Recent Turnover in key Decision Maker | 8 |
| Total | 41 |
| Assessment | 82% |

| Can We Satisfy Them? | Rating (1-5) |
|---|---|
| Existing state where we have done business | 7 |
| Existing relationship | 9 |
| Unsatisfied with present vendor | 9 |
| Technology Savvy | 10 |
| Short on staff | 9 |
| Total | 44 |
| Assessment | 88% |

| Ideal Sales Fingerprint Overall Score | Rating (1-5) |
|---|---|
| Total | 130 |
| Score | 87% |

*FIG. 2*

Unacceptable Client Profile

| Attributes | 1= Yes, 0= No |
|---|---|
| Billing Department is a laggard | 0 |
| Does not file reports on time | 1 |
| Wrong technology platform | 0 |
| Poor Financial Conditions | 0 |
| Under a Reorganization | 0 |
| No need for Product/Service | 0 |
| No budget | 0 |
| Happy with present vendor | 0 |
| Past bad experience with Seller | 0 |
| Total | 1 |
| Assessment | 11% |

*FIG. 3*

Unique Competitive Advantage

| Which Competitive Advantages did the prospect respond to | 1 = Yes, 0 = No |
|---|---|
| Fast turnaround time (30-45 days) | 1 |
| Special technology to cross reference all 9 CWF regions | 1 |
| Dedicated Federal DSH team | 1 |
| 98% Audit Approval | 1 |
| Audit Support | 1 |
| On site research, if needed | 1 |
| Lower price | 0 |
| Total | 6 |
| Assessment | 86% |

*FIG. 4*

Key Decision Makers

Have you identified the names of all the Decision Makers (Y or N)     Yes

% of Decision makers that are champions     80%

| Name | Title | Buying Role | Business Agenda | Personal Agenda | PA & BA Satisfied (Y/N) | Champion (1-10) | Yrs at Co. | Hired by | Reports to | Previous Employers | Previous Titles | People Who Can Influence |
|---|---|---|---|---|---|---|---|---|---|---|---|---|
| Key Buyer 1 | CEO | | Wants better Billing | Gets a raise if better billing | Y | 10 | 15 | | | | | |
| Key Buyer 2 | CFO | | Reduce days outstanding | Gets a promotion if less days outstanding | Y | 10 | 23 | | | | | |
| Key Buyer 3 | Director of IT | | Reduce IT Time. | Wants less work | Y | 10 | 20 | | | | | |
| Key Buyer 4 | Director of IT | | Reduce IT Time | | N | 10 | 1 | | | | | |
| Key Buyer 5 | VP of Marketing | | Wants to reduce | Increase in Stock Price | Y | | | | | | | |
| | | | | | | 80% | | | | | | |

Note any person that does not have a Personal Agenda and Business Agenda satisfied

*FIG. 5*

Conflict Analyzer

Know Conflicts among the team
(Identify people on the decision team who have an adversarial relationship)

| Name | Title | Years at co. | Reconfirm BA & PA satisfied (Y/N) |
|---|---|---|---|
| Key Buyer 3 | Director of IT | 20 | Y |
| Key Buyer 5 | VP of Marketing | 1 | Y |
| | | | |

Note any person that you have not reconfirmed PA satisfied

*FIG. 6A*

Anticipating conflict among individuals
(Identify people with similar titles, but different years of experience at company)

| Name | Title | Years at co. | Reconfirm BA & PA satisfied (Y/N) |
|---|---|---|---|
| Key Buyer 3 | Director of IT | 20 | Y |
| Key Buyer 4 | Director of IT | 1 | |
| | | | |

Note any person that you have not reconfirmed PA satisfied

*FIG. 6B*

Anticipating Personal Agenda Conflict
Name the current Key players that might be adversely affected by you winning the business. People, who lose headcount, recommended the previous service or product, are experts in the current system, may lose their job, etc.

| Name | Title | Years at co. | Reconfirm BA & PA satisfied (Y/N) |
|---|---|---|---|
|  |  |  |  |
|  |  |  |  |
|  |  |  |  |

Note any person that you have not reconfirmed PA satisfied

*FIG. 6C*

Anticipating Group Conflict
(Identify likely groups of people based on hired by, reports to, and number of years at company)

| Name | Title | Years at co. | Hired by | Reports to | BA & PA satisfied (Y/N) |
|---|---|---|---|---|---|
| Group 1 Leader |  |  |  |  |  |
| Leaders Name |  |  |  |  | Reconfirm (Y/N) |
|  |  |  |  |  |  |
|  |  |  |  |  |  |
|  |  |  |  |  |  |
| Group 2 |  |  |  |  |  |
| Leaders Name |  |  |  |  | Reconfirm (Y/N) |
|  |  |  |  |  |  |
|  |  |  |  |  |  |
|  |  |  |  |  |  |
| Group 3 |  |  |  |  |  |
| Leaders Name |  |  |  |  | Reconfirm (Y/N) |
|  |  |  |  |  |  |
|  |  |  |  |  |  |
|  |  |  |  |  |  |

Note any group leader that you have not reconfirmed PA satisfied

*FIG. 6D*

Action Plan

| * Remember to leverage Champions where possible | | |
|---|---|---|
| Is there an opportunity? What actions will you take to further understand or increase the opportunity? | | |
| Date | Champion | Plan |
|  |  |  |
|  |  |  |
|  |  |  |

21→

| Is it worth pursuing? What actions will you take to further understand whether to pursue the opportunity? | | |
|---|---|---|
| Date | Champion | Plan |
|  |  |  |
|  |  |  |
|  |  |  |

23→

| Can we satisfy them? What actions will you take to satisfy or further understand how to satisfy the client/prospect? | | |
|---|---|---|
| Date | Champion | Plan |
|  |  |  |
|  |  |  |
|  |  |  |

25→

| Removing Unacceptable Client Profile Attributes. What actions will you take to make go/ no go decisions on UCP? | | |
|---|---|---|
| Date | Champion | Plan |
|  |  |  |
|  |  |  |
|  |  |  |

27→

| Unique Competitive Advantage. What actions will you take to make the Unique Competitive Advantages more important? | | |
|---|---|---|
| Date | Champion | Plan |
|  |  |  |
|  |  |  |
|  |  |  |

29→

| Key Qualifying Questions. What actions will you take to get the answers to key qualifying questions? | | |
|---|---|---|
| Date | Champion | Plan |
|  |  |  |
|  |  |  |
|  |  |  |

31→

| Personal Agenda and Business Agenda. What actions will you take to uncover, satisfy, or reconfirm BA and PA satisfaction? | | |
|---|---|---|
| Date | Champion | Plan |
|  |  |  |
|  |  |  |
|  |  |  |

Buyer analysis

| Name | % Fit to Ideal Sales Fingerprint | % Fit Unacceptable Client Profile | % Fit Unique Competitive Advantages | % of Decision Makers that are Champions | # of potential conflicts | All decision makers Identified | Potential sales size |
|---|---|---|---|---|---|---|---|
| Potential Buyer 1 | 99% | 0% | 100% | 100% | 0 | Yes | $90,000 |
| Potential Buyer 2 | 88% | 78% | 66% | 50% | 2 | Yes | $8,500 |
| Potential Buyer 3 | 78% | 1% | 78% | 100% | 0 | Yes | $56,000 |
| Potential Buyer 4 | 34% | 56% | 4% | 88% | 3 | Yes | $6,000 |
| Potential Buyer 5 | 1% | 78% | 17% | 0% | 5 | No | $70,000 |
| Potential Buyer 6 | 98% | 5% | 85% | 90% | 1 | Yes | $200,000 |
| Potential Buyer 7 | 92% | 7% | 100% | 88% | 0 | Yes | $75,000 |

= unacceptable scores: Seller can either stop selling or create action plan to overcome obstacles

*FIG. 8*

ANALYTIC METHOD AND SYSTEM FOR OPTIMIZING AND ACCELERATING SALES

FIELD OF THE INVENTION

The present invention generally relates to a system and method for analyzing sales opportunities, and more particularly, provides a seller of goods and/or services with the ability to predict whether potential customers are suitable to engage in a particular transaction. The present invention also assists a seller in identifying conflicts and removing unsuitable customers early in the sales process.

BACKGROUND OF THE PRESENT INVENTION

There are a few known analytical tools used in the sales force to assist companies in evaluating their sales processes and potential clients. According to these known methods, a company identifies criteria relating to potential clients, rates the clients based on the criteria and selects a specific client based on the ratings.

U.S. Patent Application Publication No. US 2005/0108103 discloses a method and system by which a "prospect qualifying calculator" is used to create a list of relevant factors to consider when determining whether a potential client should be targeted for a sale. According to this method, numerous characteristics of each prospective client are evaluated using a scoring system to determine whether the potential client is a suitable candidate. While this method is of interest, it is time consuming since it requires all of the client's characteristics to be analyzed before reaching a determination as to whether the client is suitable. Thus, it is not possible to identify and eliminate unsuitable clients early in the evaluation process.

Additionally, U.S. Patent Application Publication No. US 2005/0222850 discloses a business practices alignment method which, in part, analyzes conflicts among members of an organization. According to this method, members of the organization who can identify conflicts are identified, information is gathered from such members regarding the potential conflicts and alternative resolutions to the conflicts are analyzed. While this method is of interest, it is performed in the context of a particular business' own internal practices, and does not consider a sales situation where a seller and potential customer work together to resolve conflicts.

SUMMARY OF THE INVENTION

There is a long-felt need for a system and method for analyzing a sales opportunity in which unsuitable customers are eliminated early in the analysis process and potential conflicts are identified among decision makers at a customer, wherein the seller works with the customer to resolve such conflicts. The present invention seeks to solve these long-felt needs and overcome the problems associated with the known methods and systems of the prior art.

In particular, it is an object of the present invention to provide a system and method which enables a seller to identify and remove unsuitable potential customers early in the sales process while at the same time identifying potential customers who are suitable to conduct business with.

It is another object of the present invention to provide a method and system for analyzing conflicts likely to arise among decision makers at a potential customer and assisting the potential customer in resolving such conflicts.

It is another object of the present invention to provide a system and method for determining whether a seller provides a competitive advantage to a potential customer, and if not, creating a plan which would enable the seller to provide the customer with a competitive advantage.

It is another object of the present invention to provide a system and method for rating a customer's characteristics against key attributes needed for a particular transaction.

It is another object of the present invention to solve the shortcomings of the prior art.

Other objects will become apparent from the foregoing description.

It has now been found that the above related objects of the present invention are obtained in the form of a system and method for analyzing a sales opportunity which comprises the steps of: gathering information about a group of decision makers for a potential transaction; determining if there is any conflict among the group of decision makers; where there is a conflict, identifying a champion who is in a position to resolve the conflict in favor of entering into the transaction; resolving the conflict with the champion; and generating a report as to whether the one or more conflicts have been resolved. In one embodiment, the gathered information about the group of decision makers comprises each decision makers' position and number of years of experience as well as an identification of a decision maker within the group who has authority (e.g., a manager, a person who has hired a decision maker) over other decision makers in the group. Additionally, the following types of decision makers can be identified: those having a similar title but different years of experience; those who are likely to be adversely affected by the transaction; those who will lose status; those who will lose power; and those who will have a reduction in staff. Additionally, the business and/or personal agenda of each decision maker is identified and analyzed to determine whether such agendas will likely be satisfied by the transaction.

According to another embodiment, a system and method of analyzing a sales opportunity is provided, which comprises the steps of: establishing a plurality of profiles, wherein each profile comprises a set of attributes that assists a seller in evaluating a potential customer; gathering information relating to at least some of the attributes for at least one potential customer; analyzing the information for each of the profile attributes to which the information relates; determining for each of the analyzed profiles whether the customer has unsatisfactory characteristics for one of the plurality of profiles; and ceasing the sales opportunity analysis before completing an analysis of all of the plurality of profiles if it is determined that the potential customer has unsatisfactory characteristics for one of the plurality of profiles other than the final profile. In one embodiment, the plurality of profiles are based on demographic and/or psychographic information and comprises two or more of the following: a profile of an ideal customer; a profile of an unacceptable customer; a form for assessing whether a seller's products or services meet the potential customer's needs; a form for identifying decision makers; a form for analyzing conflicts among decision makers; a unique competitive advantage form; a decision makers form; and a conflict analyzer. Additionally, an action plan can be created after ceasing the analysis to help the potential customer improve upon the unsatisfactory characteristics.

According to another embodiment, a system and method for analyzing a sales opportunity is provided which comprises the steps of: gathering information about a customer's needs; identifying attributes relating to the customer's needs; assessing whether a seller has resources to meet one or more of the attributes; and generating a report based on the assessment of whether the customer is likely to enter into a transaction with the seller. In one embodiment, the attributes relating to the customer's needs comprises one or more of the following: whether the seller can provide its goods and/or services within a turnaround time which meets the customer's needs; whether the seller can provide the customer with onsite research; whether the seller can provide the customer with a favorable price; whether the seller can provide the customer with audit support; whether the seller has an audit approval rate which would satisfy the customer's needs; and whether the seller has a dedicated team to assist the customer.

BRIEF DESCRIPTION OF THE DRAWINGS

The above and related objects, features and advantages of the present invention will be more fully understood with reference to the following detailed description of the preferred, albeit illustrative, embodiments of the present invention when considered in conjunction with the accompanying figures, wherein:

FIG. 1 is one embodiment of a questionnaire provided to customers in accordance with the sales analysis method of the present invention;

FIG. 2 is an embodiment of an ideal sales fingerprint utilizing the sales analysis method of the present invention;

FIG. 3 is an embodiment of an unacceptable client profile used in the sales analysis method of the present invention;

FIG. 4 is an embodiment of a unique competitive advantage form used in the sales analysis method of the present invention;

FIG. 5 is an embodiment of a key decision maker's form used to identify conflicts in the sales analysis method of the present invention;

FIGS. 6A-6D include embodiments of conflict analyzer forms used to analyze conflicts at a potential customer;

FIG. 7 is an embodiment of an action plan which is used for each of the profiles and forms shown in FIGS. 2-6D;

FIG. 8 is an embodiment of a buyer analysis form in which a plurality of potential customers' characteristics are compared.

DETAILED DESCRIPTION OF THE PREFERRED EMBODIMENTS

Figure 9:
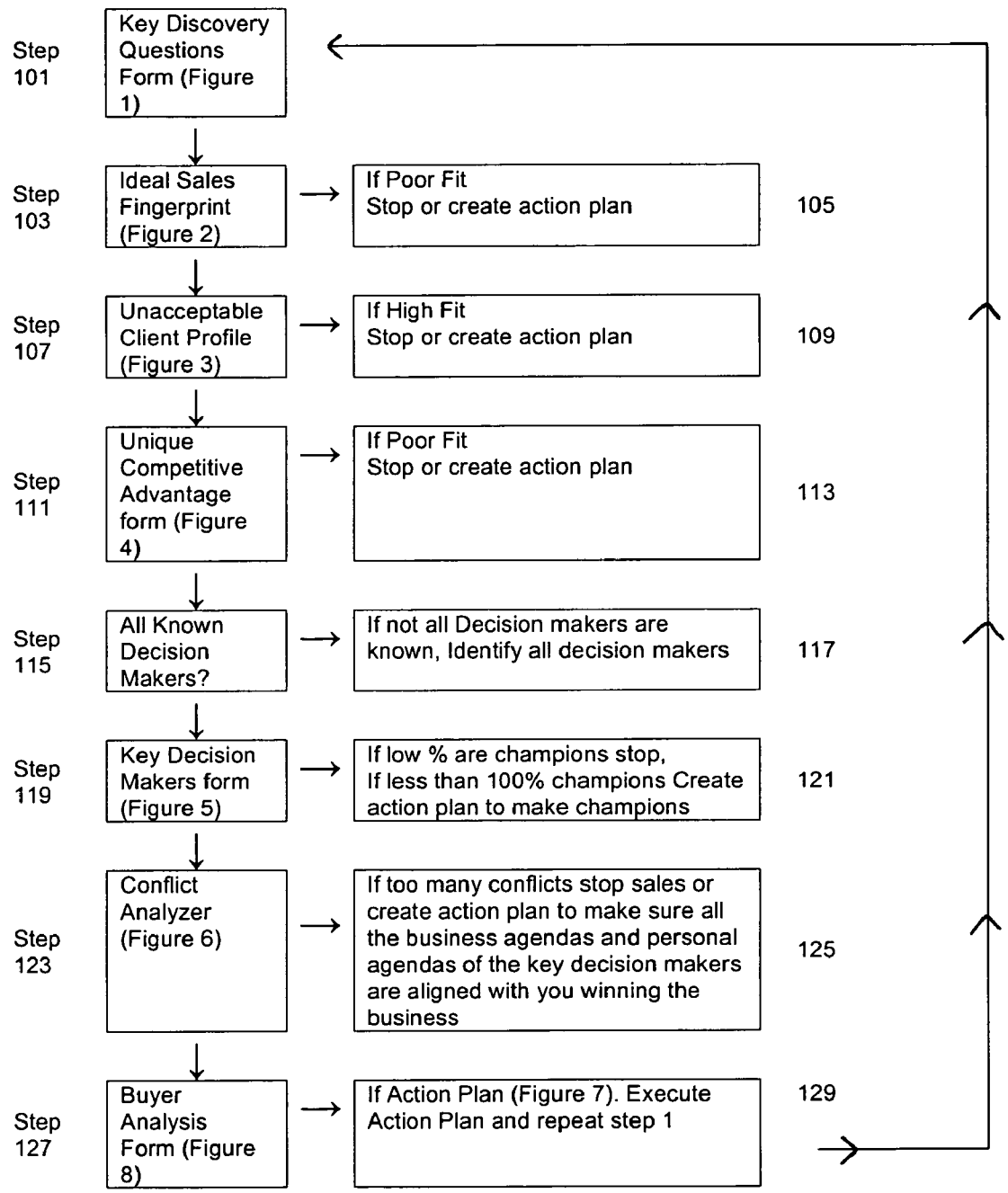
FIG. 9 is a flowchart depicting the overall process implemented in the sales analysis method of the present invention.

The present invention is directed to a system and method for analyzing, optimizing and accelerating sales opportunities. According to the system and method of the present invention, a seller of goods and/or services develops a set of questions for potential customers, an ideal customer profile, an unacceptable customer profile, a unique competitive advantage form and a conflict analyzer. Based on each potential customer's answers to questions, the seller assesses and rates the relevant potential customer's characteristics which relate to each profile. At each step of this analysis, the seller determines whether the potential customer is likely to close a sale and is a suitable customer which meets the seller's expectations and needs. According to this method, it is possible to identify and eliminate unacceptable customers early in the sales process and focus on candidates who meet the seller's needs.

Before describing the operation of the present invention it should be noted that the system and method can be performed across a variety of different platforms, including, for example, a computer having data entry and processing software (e.g., Microsoft Excel®), an internet website (e.g., via HTML forms and correlated databases for storing entered data), customized software having data entry and storage capability and/or conventional paper forms and recordkeeping methods. One skilled in the art would understand from the following description of the method and system of the present invention how to implement the same in any of the above platforms.

According to the present invention, for each seller of products and/or services, the seller creates a questionnaire including a set of questions for potential customers which will help the salesperson determine whether the potential customer has desirable characteristics to warrant doing business with the customer. These questions seek to elicit psychographic and demographic information about the customer which will help the seller determine whether the customer has an ideal customer profile and/or an unacceptable customer profile, whether the seller's products and/or services will provide the customer with a unique competitive advantage and whether there will be any potential conflicts among key decision makers at the customer, and if so, how to resolve such conflicts. One example of this questionnaire is shown in FIG. 1. Since this questionnaire will be unique for each seller of products and/or services, the questionnaire is merely exemplary of the type of questions to be asked of the potential customer. Of course, it is possible to standardize at least some questions for a particular industry or industries.

According to the system and method of the present invention, for each seller of a potential product and/or service, there exists a set of key attributes unique to the seller that, if present, would make a potential customer an ideal customer to the seller. In one embodiment, this set of key attributes is referred to as an ideal sales fingerprint. The attributes for the ideal sales fingerprint are psychographic and demographic. Examples of such demographics include, but are not limited to, the potential customer's number of employees, size, revenue, type of business and geographic location, to name a few. Examples of psychographics on the ideal sales fingerprint include, but are not limited to, whether the potential customer is innovative, conservative, progressive, risk averse (e.g., do they buy the safest product), risk takers, price sensitive, and likely to buy leading technology, to name a few. The key attributes for an ideal sales fingerprint may be different for each seller, and thus, the seller should first analyze, identify and define the attributes that its ideal customers should have. From this information, a list of key attributes is generated and stored (e.g., in a database).

FIG. 2 shows an example of an ideal sales fingerprint tailored to the needs of a seller of outsourced Medicaid and Medicare accounting and billing services to hospitals. The business objective of the seller is to assist hospitals in obtaining larger reimbursements from Medicaid and Medicare for medical claims, and in this example, the potential customers under consideration are large hospitals. In this example, various categories of information are included in the ideal sales fingerprint, including, for example, an opportunity overview, whether the customer presents a good opportunity, whether the customer is worth pursuing and whether the seller can satisfy the customer's needs. Under each of these categories of information, various attributes are noted and scored. For example, under "Opportunity?", the larger the hospital (i.e., the potential customer), the more likely the seller will be able to get larger returns from Medicare and Medicaid. Additionally, according to this seller's needs, the ideal hospital would have a relatively high percentage (e.g., 15-20%) of Medicaid patients and a high social security utilization rate, as these attributes would increase the potential return of reimbursements from Medicaid and Medicare. Additionally, the seller considers whether the hospital has the resources to challenge Medicaid and Medicare payments. In this regard, the seller considers whether the hospital has appealed or reopened a Package within the last three years. Similarly, the seller assesses whether the hospital is currently filing a DHS and, if so, whether it is doing it in-house. If the hospital is not filing a DHS or is doing it in-house, there is likely a better opportunity for the seller to provide its services to the hospital.

Under the "Worth Pursuing?" category, the seller considers whether the hospital has good access data which can be processed by the seller, whether the hospital's demographics data is electronic, whether the hospital admits to pain (e.g., the hospital needs assistance in challenging Medicare and Medicaid awards), advantages inherent to the location of the hospital and whether there has been recent turnover in key decision makers at the hospital.

Additionally, under the "Can We Satisfy Them?" category, the seller considers whether the hospital does business in the state where the seller has already done business (e.g., whether the seller is already proven in the state), whether the seller has an existing relationship with the hospital, whether the hospital is unsatisfied with other vendors that it is currently using, whether the hospital has sufficient technology sophistication and a sufficient staff to devote the necessary resources needed for the seller to efficiently provide its services.

Next, the information obtained from the potential customer in response to the customer questionnaire (FIG. 1) is applied to and analyzed for each of the relevant categories and attributes in the ideal sales fingerprint. More particularly, the seller measures whether and to what extent the potential customer meets each of the key attributes in the ideal sales fingerprint. In one embodiment, the seller rates the potential customer on a scale of 1-10, with a 10 indicating that the attribute is fully present in the customer and a 1 indicating that the attribute is lacking. Of course, any other metrics can be used to evaluate the customer in the ideal sales fingerprint. All key attributes in the ideal customer profile are rated and all unknown attributes are given the lowest score. All rankings are totaled and presented as a percentage fit to the ideal customer profile. In the example shown in FIG. 2, the higher the ranking, the more likely the potential customer opportunity is to complete the sale.

If the potential customer has a rating which scores below a threshold which the seller considers to be acceptable, then the sales evaluation of the potential customer stops and the potential customer is removed from consideration. Alternatively, an action plan (discussed below), can be created to work with the potential customer to improve its characteristics. In the example shown in FIG. 2, the seller rated the potential customer as having the following scores: 90% (i.e., a score of 45/50) of the characteristics needed to provide the seller with a good opportunity; 82% (i.e., a score of 41/50) of the characteristics which make the potential customer worth pursuing; 88% (i.e., a score of 44/50) of the characteristics for which the seller can satisfy the potential customer's needs; and a total of 87% (i.e., a score of 130/150) of all of the attributes considered under the ideal sales fingerprint profile.

If, as in FIG. 2, the potential customer under analysis scores are acceptable (here an 87% fit) under the ideal sales fingerprint analysis, the seller next analyzes whether the potential customer has any other characteristics which would make such customer unacceptable to the seller. In this regard, for each seller of products and/or services, there are key attributes of a potential customer that would indicate to the seller that the customer is unlikely to buy the seller's product and/or service, or that the customer has certain characteristics which are undesirable to the seller. Here again, these attributes are both psychographic and demographic, and could include, for example, poor billing practices, poor financial condition, an inefficient billing department, to name a few. Such attributes typically vary for each seller of products and/or services, and could even vary within a particular industry for sellers of the same product. Thus, the seller must analyze, identify, define and store the key attributes of an unacceptable client, which in FIG. 3, is referred to as an unacceptable client profile.

Based on information provided by the potential customer in response to the customer questionnaire (FIG. 1), the potential customer under analysis is measured on a scale of 1 and 0, where the attribute is assigned a score of 1 if present, and a score of 0 if not present. Of course, it is possible to rate the potential customer under any other metrics (e.g., using a scale of 1-10). In the embodiment shown in FIG. 3, all unknown attributes are given the highest score, which in this case, is the worst score. All rankings are totaled and presented as a percentage fit to the unacceptable customer profile. These scores are then added together and a determination is made as to whether the customer has an unacceptable profile.

In the example shown in FIG. 3, the lower the ranking, the more likely the potential sales opportunity will become a completed sale. Conversely, the higher the score, the greater the likelihood the seller would not want to do business with the potential customer. In the example shown in FIG. 3, the potential customer has 11% (i.e., a score of 1/9) of the attributes of an unacceptable customer, and the seller would likely proceed with the sales process. If, however, the scores of the potential customer in the unacceptable customer profile are too high, then the process is stopped and the potential customer is removed from consideration. Alternatively, the seller could create an action plan (FIG. 7) to remedy these deficiencies with the potential customer.

If, as in FIG. 3, the potential customer does not have an unacceptable client profile, then the seller continues its analysis and evaluates whether it can provide the potential customer with a unique competitive advantage. In this regard, there is typically a set of key attributes relating to a seller's product and/or service that makes such product and/or service desirable to customers. Accordingly, the seller first establishes and stores a list of key attributes of its product and/or service which would provide its customers with a unique competitive advantage. Based on the customer's responses to the customer questionnaire (FIG. 1), the seller analyzes whether its product and/or service would provide the potential customer with a unique competitive advantage.

One embodiment of the unique competitive advantage is shown in FIG. 4, and includes attributes such as whether the seller can provide the customer with a fast turnaround time, audit support, onsite research and good pricing, to name a few. The information provided by the customer is analyzed against the key attributes in the unique competitive advantage form and is rated on the same 1,0 scale used in the unacceptable client profile. Of course, it is possible to rate the potential customer under any other metrics (e.g., using a scale of 1-10). In this case, the higher the ranking, the more likely the potential sales opportunity is to result in a completed sale. The ratings are totaled and presented as a percentage fit to the unique competitive advantage which should be provided to the customer. As shown in the example of FIG. 4, the seller has 86% of the attributes which should provide the potential customer with a unique competitive advantage. If the seller has a score that is too low, and thus does not have enough attributes that would provide the customer with a unique competitive advantage, then the seller is not a good match for the customer and the sales evaluation process stops and the customer is removed from consideration. Alternatively, the seller can create an action plan to improve its product and/or service so that it could provide the potential customer with a unique competitive advantage.

If, as in FIG. 4, the seller determines that its product and/or service would provide the potential customer with a unique competitive advantage, the seller next analyzes potential conflicts which may arise among decision makers of the potential customer. More particularly, in each decision making process to purchase a product and/or service, a potential customer can have multiple decision makers who will be deciding whether to purchase the seller's product and/or service. According to the method of the present invention, the seller identifies all of the potential customer's decision makers from the information provided in the customer questionnaire (FIG. 1). If necessary, the seller should confer with the relevant personnel at the potential customer to identify any key decision makers not identified in the potential customer's response to the questionnaire. Once the key decision makers have been identified, the seller determines whether there are any business and/or personal benefits to be obtained by each decision maker by purchasing (or refusing to purchase) the seller's goods and/or services.

In one embodiment, a key decision maker's form is created and stored for each potential customer and includes a set of questions that seeks to elicit an identification of all of the potential customer's decision makers for the related transaction, their business and personal agendas, who such decision makers report to and who hired the decision makers. Preferably, these questions are included in the questionnaire of FIG. 1, although it is certainly possible to separately provide these questions to the potential customer at any other time during the evaluation process.

Referring to FIG. 5, one embodiment of the key decision maker form is shown. In this embodiment, the potential customer is asked to identify all of the decision makers likely to be involved in the purchase of the seller's goods and/or services, as well as the percentage of those decision makers who are likely to be champions (e.g., lead supporters) of such transaction. Additionally, the potential buyer is asked to provide the name of each key decision maker, their title, their role in buying the goods and/or services, their respective business agendas (e.g., better billing desired, reduced IT time, etc.), their personal agendas (e.g., raises, promotions, etc.), whether their personal and business agendas would be satisfied by the transaction, whether such decision makers are champions for the transaction, the number of years that the decision maker has worked for the potential customer, who the decision makers had been hired by and who they report to, previous positions held, previous titles and individuals who are likely to have an influence over the decision makers. Additionally, the champions' ability to influence other decision makers is rated on a scale of 1-10 or any other metrics.

Once the seller confirms and identifies conflicts among the decision makers who will be deciding whether to enter into the purchase of the seller's products and/or services, the seller analyzes such conflicts and determines whether and how to resolve the conflicts to enable completion of the transaction. To do so, the seller identifies known conflicts of personal and business agendas between members of the potential customer's decision making team. Additionally, the seller identifies decision makers who would be adversely affected by the purchase (e.g., those who will lose status or power, those who will have to reduce staff, etc.). Next, decision makers with similar titles but different numbers of years of service at the potential customer are identified. Often, such individuals may have different personal and business agendas, and thus, are likely to have conflicts with each other. Next, the seller identifies the decision makers who will likely have influence over the decision makers for which there is a conflict. For example, a first decision maker who has hired a second decision maker would likely have influence over the second decision maker. Likewise, a first decision maker who manages a second decision maker will likely have influence over the second decision maker. Thus, the decision makers with the most influence or authority over the other decision makers in conflict are identified. The seller creates a plan to work with that influential or authoritative decision maker(s) to create a plan of action to resolve any conflicts, and then executes that plan to ensure that the transaction for the goods and/or services is not thwarted by the identified conflicts.

An embodiment of the conflict analyzer of the present invention used to perform the foregoing steps is shown in FIGS. 6A-6D. Referring to FIG. 6A, the seller has identified known conflicts among the decision making team of the potential buyer. In the example shown in FIG. 6A, Key Buyer 3 and Key Buyer 5 have been identified as having a potential conflict. Each of these key buyers' title and years of experience have been identified. Additionally, the seller has confirmed that each of the key buyers in conflict have business and/or personal agendas that would be satisfied if they entered into or declined to enter into a transaction with the seller.

Referring to FIG. 6B, the seller has also anticipated conflicts among key buyers having similar titles but having different years of experience at the potential customer. Here, Key Buyer 3 who has been the director of IT for 20 years at the potential buyer has been identified as having a potential conflict with Key Buyer 4, who is also a director of IT, but has only worked for the potential customer for one year. Here again, to the extent possible, the seller should reconfirm whether or not the transaction would satisfy the business agendas and personal agendas of each key buyer for which there is a potential conflict.

Next, the seller identifies key individuals at the potential customer who have personal agendas that might be adversely affected should the potential customer decide to purchase the seller's products and/or services, as shown in FIG. 6C. Here again, it is preferable that for each such person, the seller reconfirm whether their business and personal agendas would be satisfied. In this example, the seller has not identified any personal agenda conflicts.

Next, as shown in FIG. 6D, the seller identifies likely groups of individuals within a group at the potential customer who may have conflicts. For example, the group can consist of decision makers who have been hired by a particular individual and decision makers who report to a particular individual. Here again, it is preferable to reconfirm whether such individual's personal and business agendas have been satisfied.

Once the existing and potential conflicts are identified, the seller should identify the champions for the transaction or the individual decision makers with authority over those decision makers for which there are existing or potential conflicts. Next, the seller creates an action plan to assist the identified influential decision maker to resolve the conflicts. Alternatively, if the conflicts cannot be resolved and are deemed to be insurmountable, then the seller should remove the potential customer from consideration. Assuming the conflicts can be resolved, then the evaluation process continues and the overall ratings of the potential customer for each profile is finalized.

For each stage of the sales analysis described above, if a potential customer receives a score which would cause the seller to stop their analysis, the seller can optionally create an action plan to correct the deficiencies of the customer (or the seller in the case of the unique competitive advantage analysis). For example, as shown in FIG. 7, an action plan can be created to determine whether there is an opportunity 21, whether the opportunity is worth pursuing 23, whether the seller can satisfy the potential customer 25, how to remove the characteristics of an unacceptable customer 27, how to provide the potential customer with a unique competitive advantage 29, what actions are necessary to get the information needed to analyze the customer 31 and what actions are necessary to identify any potential conflicts of the potential customer 33. Each action plan will be unique to the seller's and potential customer's needs and characteristics.

The foregoing sales analysis process can be repeated for a multitude of potential customers. Each potential customer's scores for each profile can then be compared in a side-by-side analysis, as is shown in the exemplary buyer analysis form of FIG. 8. Referring to FIG. 8, the seller has evaluated seven potential customers. Potential Buyer 1 has the highest percentage fit to the ideal sales fingerprint (i.e., 99%), and Potential Buyer No. 5 has the lowest percentage fit (i.e. 1%). Thus, Potential Buyer 1 has the most characteristics desired by the seller under the ideal sales fingerprint.

Under the unacceptable client profile column of FIG. 8, Potential Buyer 1 has the lowest percentage fit (i.e., 0%) and Potential Buyers 5 and 7 have the highest percentage fit (i.e., 78%). The seller should preferably determine a threshold score above which any scores would be unacceptable. Of course, the determination is subjective and based on the seller's needs. Thus, Potential Buyer 1 would be the most desirable candidate for a sale and the Potential Buyers 2 and 7 would be the least desirable. Under the unique competitive advantages profile, the seller has 100% of the characteristics needed to provide Potential Buyer 1 with a unique competitive advantage, whereas the seller only has 17% of such characteristics for Potential Buyer 5. Thus, the seller under this category would be the best match with Potential Buyer 1, and a poor match with Potential Buyer 5. Under the decision makers that are champions category column of FIG. 8, 100% of Potential Buyer 1's decision makers are champions for the transaction and 0% are champions for Potential Buyer 5. Likewise, there were no potential conflicts for Potential Buyer 5. Similarly, all decision makers were identified for Potential Buyer 1 but none were identified for Potential Buyer 5. Lastly, the potential sales to Buyer 1 is $90,000 whereas potential sales to Potential Buyer 5 is $70,000. Thus, although the sales potential for Potential Buyers 1 and 5 is similar, the seller should consider Potential Buyer 1 as a more suitable customer.

It should be noted that although all of the five profiles of the present invention were analyzed for Potential Buyer 5, according to the method of the present invention, the seller should stop its analysis of Potential Buyer 5 upon the first occurrence of an unacceptable score. Here, the seller would stop its analysis of Potential Buyer 5 after completing the ideal sales fingerprint analysis. However, as noted in the shading in FIG. 8, the seller also has the option of creating an action plan to overcome the potential customer's shortcomings. Thus, in the scenario shown in FIG. 8, for each potential buyer who had an unacceptable score for a particular profile, the seller temporarily stopped its analysis process to create an action plan and attempted to overcome these obstacles.

Moreover, it is noted that there are other potential buyers in FIG. 8 who would be desirable to seller since they have similar scores to Potential Buyer 1. For example, Potential Buyer Nos. 3, 6 and 7 all have acceptable scores for all profiles evaluated. Potential Buyers 2 and 4, by contrast, may be unacceptable to the seller given their high scores in the unacceptable client profile and low sales size potential in comparison with the remaining potential buyers.

Having described each of the aspects of the present invention, one embodiment of the method for analyzing, optimizing and accelerating a potential sale is described with reference to FIG. 9. First, a seller of goods or services develops a customer questionnaire (FIG. 1) which is provided to a potential customer, step 101. Based on the answers provided by the potential customer, the seller fills out the ideal sales fingerprint and rates the potential customer (FIG. 2), step 103. If the potential customer's scores do not meet a minimum threshold on the ideal sales fingerprint, the seller stops the sales process, or creates an action plan to overcome the potential customer's shortcomings, step 105. If the seller does not have enough information to fill out the ideal sales fingerprint, the seller should go back to the customer and query such customer for that information.

If the potential customer scores are acceptable on the ideal sales fingerprint, the seller next determines whether the customer has an unacceptable customer profile. In this regard, based on the information provided by the potential customer in the key questionnaire (FIG. 1), the seller fills out the unacceptable client profile form (FIG. 3) and rates the potential buyer, step 107. If the potential customer's scores are unacceptable, the seller stops the sales evaluation process, or alternatively develops an action plan to deal with the deficiencies of the potential customer, step 109. If the potential customer's score is acceptable, the seller proceeds to the unique competitive advantage form to analyze whether its product and/or service would provide the potential customer with a unique competitive advantage, step 111. If the seller's scores are unacceptable on the unique competitive advantage form (FIG. 4), the seller stops the sales process, or alternatively, creates an action plan to make the product and/or service more important to the potential customer, step 113.

If the seller's scores are acceptable on the unique competitive advantage form, the seller next identifies all known decision makers of the potential customer, steps 115, 117, and completes the key decision makers form (FIG. 5), step 119. If the percentage of known decision makers that are champions is small, the seller can either stop the sales process or create an action plan to better understand and satisfy the business and personal agendas of the decision makers that are not champions and help them become champions, step 121. Assuming the number of champions is sufficient, the seller analyzes all known conflicts using the conflict analyzer form (FIGS. 6A-6B), step 123. If there are too many conflicts, the sales process is stopped and an action plan is created to ensure that all business agendas and personal agendas of the key decision makers are aligned with the seller's interests for winning their business, step 125.

Next, if the identified conflicts can be resolved or overcome, the analysis of the potential customer is completed and scores for each category evaluated are entered into the buyer analysis form (FIG. 8), step 127. Thus, it is possible to conduct a side-by-side comparison of each potential customer for each of the profiles discussed herein. If any action plans have been created for the potential buyer, then steps 101 through 127 are repeated, step 129. After each sale of products and/or services is completed or lost, the seller should review and analyze the potential customer to see if any updates should be made to the ideal sales fingerprint, the unacceptable client profile, the unique competitive advantages form, the key discovery questionnaire, the key decision maker's form and the conflict analyzer. It should be noted that the foregoing method is not limited to any particular order and can be modified according to the seller's needs.

Now that the preferred embodiments of the present invention have been shown and described in detail, various modifications and improvements thereon will become readily apparent to those skilled in the art. Accordingly, the spirit and scope of the present invention is to be construed broadly and limited only to the appended claims.

What is claimed is:

1. A method of analyzing a sales opportunity comprising the steps of:

establishing, using at least one processor, a plurality of profiles, stored in at least one processor readable memory, wherein each profile comprises a set of attributes that assists a seller in evaluating a potential customer;

gathering, using at least one processor, information, stored in at least one processor readable, relating to at least some of said attributes for at least one potential customer;

analyzing, using at least one processor, said information, stored in at least one processor readable memory, for each of the profile attributes to which said information relates;

determining, using at least one processor, for each of said analyzed profiles whether said potential customer has unsatisfactory characteristics for one of said plurality of profiles;

ceasing, using at least one processor, said sales opportunity analysis before completing an analysis of all of said plurality of profiles if it is determined that the potential customer has unsatisfactory characteristics for one of said plurality of profiles other than said final profile;

wherein said plurality of profiles comprises a profile of unacceptable customer characteristics; and wherein said profile of unacceptable customer characteristics comprises each of the following attributes:

whether the customer has poor billing practices, whether the customer is in poor financial condition, whether the customer is in reorganization, whether there is a customer need for the seller's product or service, whether the customer has a budget, and whether the seller has provided the customer with a prior negative experience.

2. The method of claim 1, further comprising the step of creating an action plan after ceasing said sales opportunity analysis.

3. The method of claim 1, wherein said plurality of profiles comprises two or more of the following: a profile of an ideal customer; a form for assessing whether a seller's products or services meet the potential customer's needs; a form for identifying decision makers; a form for analyzing conflicts among decision makers; a form for identifying unique competitive advantages; a form for identifying decision makers; and a form for analyzing conflicts.

4. The method of claim 3, wherein said profile of an ideal customer comprises attributes from one or more of the following categories: whether the sales opportunity is beneficial; whether the sales opportunity is worth pursuing; and whether the seller can satisfy the customer's needs.

5. The method of claim 3, wherein said form for assessing whether a seller's products or services meet the potential customer's needs comprises one or more of the following attributes: whether the seller can provide its goods and/or services within a turnaround time which meets the customer's needs; whether the seller can provide the customer with onsite research; whether the seller can provide the customer with a favorable price; whether the seller can provide the customer with audit support; whether the seller has an audit approval rate which would satisfy the customer's needs; and whether the seller has a dedicated team to assist the customer.

6. The method of claim 3, wherein said form for identifying decision makers comprises one or more of the following categories of information for each decision maker: name; title; buying role; business agenda; personal agenda; whether said business agenda would be satisfied by the seller's goods or services; whether said personal agenda would be satisfied by the seller's goods or services; whether a lead supporter has influence over each of said decision makers; number of years of service at said customer; person who has hired each of said decision makers; person to whom each of said decision makers reports; prior positions held; prior titles; and people who can influence said decision makers.

7. The method of claim 6, further comprising the steps of:

anticipating conflicts among decision makers at a potential customer;

analyzing said conflicts; and resolving said conflicts with assistance of a lead supporter having influence over said decision makers for which a conflict exists.

8. The method of claim 1, further comprising the step of comparing analyses of a plurality of potential customers.

9. The method of claim 1, further comprising the step of providing said potential customer with a questionnaire which elicits information pertaining to one or more of said plurality of profiles.

10. The method of claim 1, wherein said plurality of profiles are based on demographic and/or psychographic information.

* * * * *